(12) United States Patent
Freise

(10) Patent No.: US 6,211,596 B1
(45) Date of Patent: Apr. 3, 2001

(54) CLAW-POLE MACHINE

(75) Inventor: Werner Freise, Kaiserslautern (DE)

(73) Assignee: Daimler-Benz Aktiengesellschaft (DE)

( * ) Notice: Subject to any disclaimer, the term of this patent is extended or adjusted under 35 U.S.C. 154(b) by 0 days.

(21) Appl. No.: 09/194,149

(22) PCT Filed: Mar. 5, 1998

(86) PCT No.: PCT/EP98/01237

§ 371 Date: Feb. 26, 1999

§ 102(e) Date: Feb. 26, 1999

(87) PCT Pub. No.: WO98/43339

PCT Pub. Date: Oct. 1, 1998

(30) Foreign Application Priority Data

Mar. 21, 1997 (DE) .............................. 197 11 750

(51) Int. Cl.⁷ .......................... H02K 21/14; H02K 21/04
(52) U.S. Cl. ............................... 310/263; 310/91
(58) Field of Search ................... 310/67 R, 103, 310/104, 105, 160, 162, 166, 257, 263, 91; 29/596, 597, 598

(56) References Cited

U.S. PATENT DOCUMENTS

| 3,571,637 | * | 3/1971 | Henningry et al. | 310/263 |
| 4,316,111 | * | 2/1982 | Merki et al. | 310/218 |
| 4,780,637 | * | 10/1988 | Wolcott | 310/263 |
| 5,130,595 | * | 7/1992 | Arora | 310/268 |
| 5,536,987 | * | 7/1996 | Hayashi et al. | 310/263 |
| 5,651,384 | | 7/1997 | Rudrich | 137/1 |
| 5,814,907 | * | 9/1998 | Bandera | 310/14 |

FOREIGN PATENT DOCUMENTS

| 195 02 148 A1 | 1/1995 | (DE) . |
| 195 02 184 A1 | 1/1995 | (DE) . |
| 0 394 528 B1 | 4/1989 | (EP) . |
| 0 723 330 A2 | 10/1995 | (EP) . |

* cited by examiner

Primary Examiner—Ngoc-Tran Nguyen
Assistant Examiner—Tran N Nguyen
(74) Attorney, Agent, or Firm—Venable; Robert Kinberg; Catherine Voorhees

(57) ABSTRACT

A claw-pole machine has a stator and a rotor, and an exciter coil that is wound on a solid core in the rotor. The solid core extends in the radial direction into two claw magnet wheels that end in a plurality of claw-pole fingers, having a plurality of solid, radially-outward-oriented parts, and has a plurality of tangential side surfaces, which alternate axially, starting from two sides, wherein a plurality of U-shaped metal sheets are attached to the solid, radially-outward-oriented parts of the claw-pole fingers. The U-shaped metal sheets are layered one on top of the other in the axial direction to prevent eddy currents.

14 Claims, 3 Drawing Sheets

CLAW-POLE MACHINE

BACKGROUND OF THE INVENTION

Claw-pole machines are synchronous machines in which only one magnet-wheel coil is required for electrically supplying all of the exciter poles with the magnetic excitation required for the magnet-gap field. These machines are especially well-suited for higher pole-pair numbers p, because the salient-pole embodiment that is otherwise necessary provides too little space for the salient-pole coils.

Claw-pole synchronous machines are tried-and-true machines for generating currents in the area of low power. The single excitation pole 1 generates a magnetic field in the axial direction 2 that is partitioned onto the claw poles at the circumference of the rotor and, because of the alternatingly-meshing claw poles in the magnet gap, appears as a magnetic field having an alternating polarity (FIG. 1).

It is known from the European patent publication EP 0394528B1 to provide tangentially-acting permanent magnets to prevent magnetic scattering between the claw-pole fingers and the poles of the claw-pole toothed wheel; in a corresponding design, these permanent magnets support the magnet-gap field of the exciter coils. When the electrical excitation is shut off, the permanent-magnet field magnetically short-circuits over the claw-pole toothed wheel, the claw-pole-finger systems and the exciter yoke, that is, despite the excitation by the permanent magnets, the total magnet-gap field is completely settable.

At higher powers, the claw-pole embodiment is problematic, however, because the magnetically axially-acting exciter coil must encompass the entire exciter useful flux and the scatter flux of all p rotor poles of a claw side. Consequently, the cylindrical exciter yoke, which passes axially through the exciter coil, must have a minimum diameter, as stipulated by the reasonable magnetic saturation, that severely narrows the radial space for the exciter coil unless the embodiment is limited to axially-short stators. A consequence of this is high pole numbers, which, at a given rpm, drive the remagnetization frequency up. This causes greater losses, particularly in the iron parts.

SUMMARY OF THE INVENTION

It is the object of the invention to reduce these losses without worsening the mechanical stability of the pole arrangement.

This object is accomplished by a claw-pole machine having a stator, a rotor, and an exciter coil, that is wound on a solid core in the rotor, with the solid core extending in the radial direction into two claw magnet wheels that end in a plurality of claw-pole fingers, having a plurality of solid, radially-outward-oriented parts, which alternate axially, starting from two sides, where in a plurality of U-shaped metal sheets are attached to the solid radially-outward-oriented parts of the claw-pole fingers, with the sheets being layered one on top of the other in the axial direction to prevent eddy currents. Additional features of the invention are described in the dependent claims.

BRIEF DESCRIPTION OF THE DRAWINGS

The invention is described in detail below with reference to the drawings. Shown are in.

DETAILED DESCRIPTION OF THE INVENTION

Figure 1:
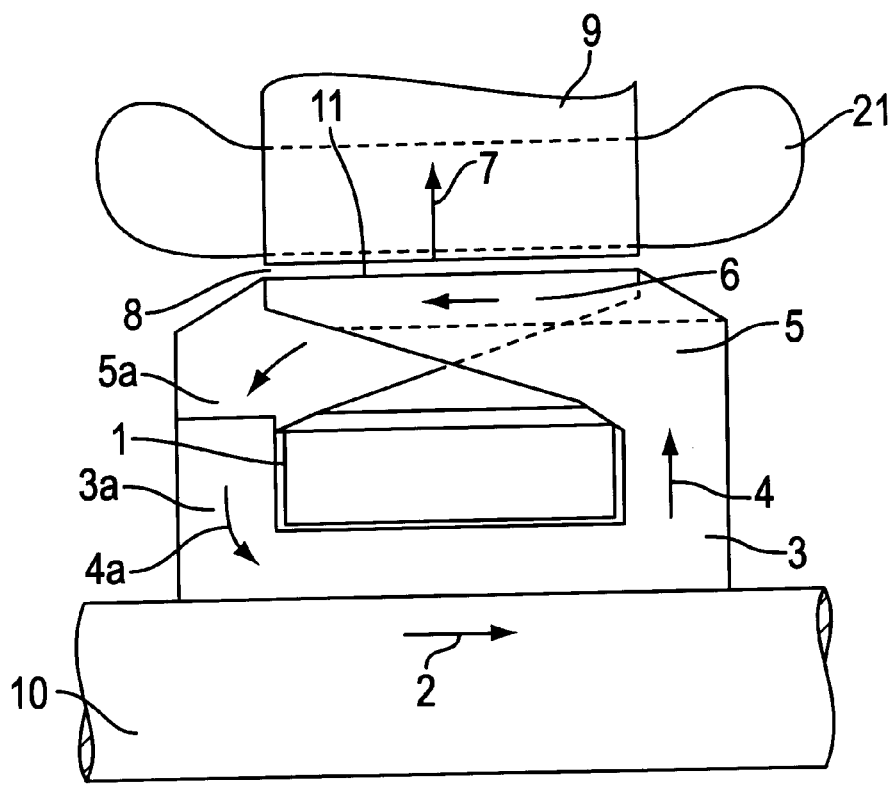
FIG. 1 a schematic representation of a claw-pole arrangement.

The magnetic field generated by the current in the exciter coil 1 has an axial course 2 in the coil itself, as shown in FIG. 1. At the end face 3, 3a of the coil, the field then transitions into a radial course 4, 4a, and is partitioned on the outside onto the claw poles 5, 5a, and is again guided into these claw poles in the axial direction 6, from where it overflows radially 7 into the magnet gap 8. It passes through the stator 9 to the adjacent rotor claw pole 5a of opposite polarity, and from there, analogously, back to the core 10 of the exciter coil 1 via the leg 3a. Because of this multiple axial-radial field diversion, the field-guiding iron parts of the magnet wheel, that is, the coil core 10, face plates 3, 3a and claw poles 5, 5a, are produced from solid iron. This is not a problem for the exciter field, which, at most, changes slowly over time. This field is, however, rapidly modulated on the claw-pole jacket surfaces 11 through the use of the stator, so eddy losses occur in the solid claw poles. To limit these losses, the magnet gap 8 between the magnet wheel and the stator must be larger than would be desirable from the standpoint of capacity.

Figure 2:
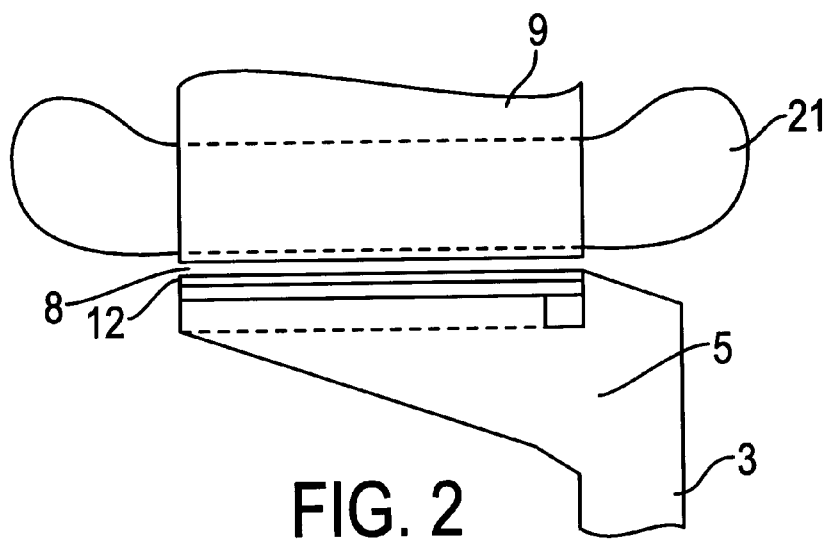
FIG. 2 a longitudinal section of the design of a claw pole.
Figure 3:
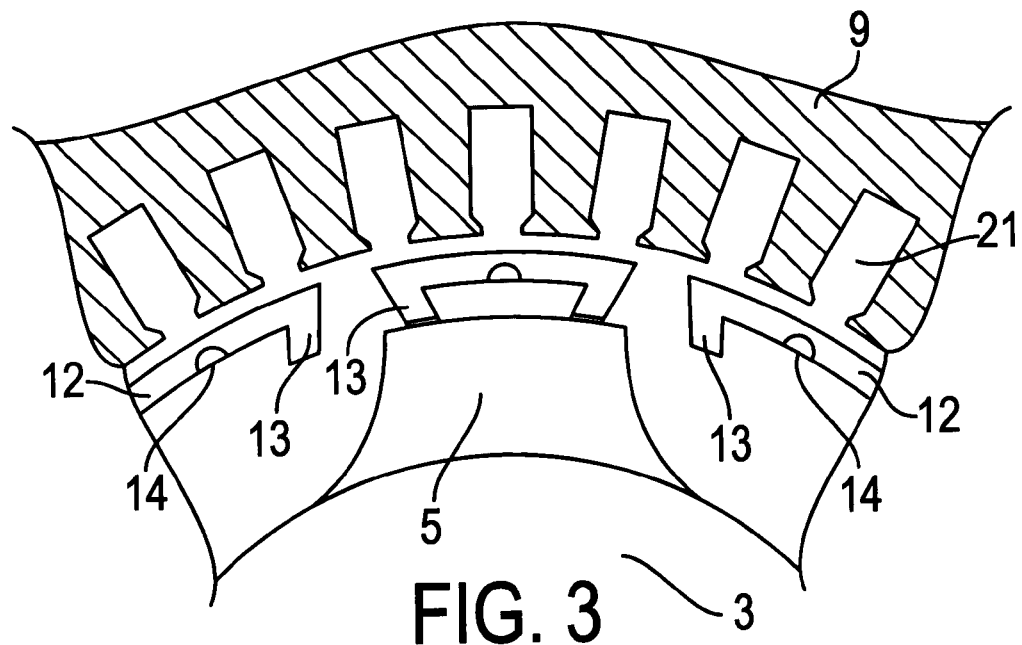
FIG. 3 a cross-section of the design of a claw pole.

In accordance with the invention, the iron losses dictated by the field pulsation in the magnet gap can be significantly reduced in the solid claw poles if only the interior of the claw poles is solid, i.e., the cores, and the poles are equipped in the outer region with metal sheets. FIGS. 2 and 3 show a detailed longitudinal section and cross-section, respectively, of this measure in a claw pole 5. The claw pole is solid in the cross-hatched region, and its jacket and side surfaces are encompassed by approximately U-shaped sheets 12, which, as stamped sheets, can be combined into a stack as a pole end prior to being secured to the claw pole. The claw poles have a uniform width over their axial length. The magnet gap 8 separates the stator 9, with the stator working winding 21, from the sheet 12 and the claw pole 5.

The sheets extend claw-like around the solid claw-pole core, so the sheets cannot follow the centrifugal forces. They can also be welded to the claw-pole core by their ends 13. In addition, the sheets are later glued to each other and the claw-pole core through dripping or saturation.

One or more recesses 14 can be stamped into the sheet segment extending along the circumference. This allows a better adaptation of the inside sheet contour to the claw poles, but most importantly, it permits a prevention of the armature field.

It is possible to reduce the magnet gap by about half with the reduction in eddy losses attained with the sheet arrangement in the outer claw-pole region. The parallel-flank arrangement of the claw poles, which otherwise usually mesh in a roughly sinusoidally-pointed manner, assures a reduction in the iron losses in the stator 9, because the magnetic axial flux in the stator that occurs with axially "pointed" poles is avoided. The resulting non-sinusoidal course over time of the induced voltage in the stator winding is a further functional advantage with an open circuit of the winding and subsequent rectification. Because of this, and because of the reduced magnet gap, the magnet-gap field itself and the counter-inductances, and therefore the desired generator current, are increased. Efficiencies increases significantly.

Of course, the stamping tool can also shape the outside jacket contour of the sheet stack to produce a "sinus pole,"

that is, an expansion of the magnet gap to the tangential pole sides, effecting a sinusoidal voltage.

Figure 4:
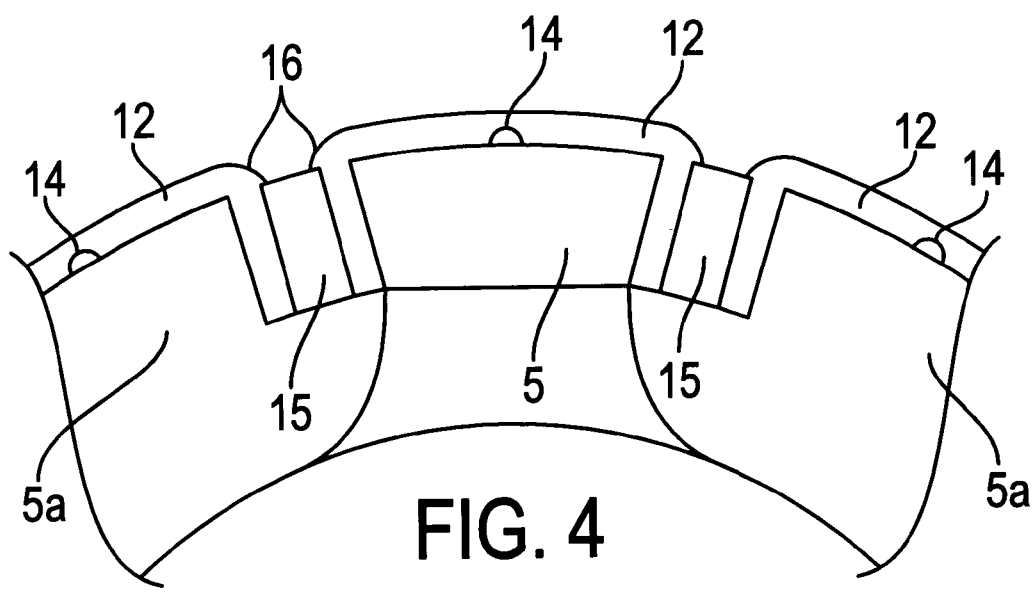
FIG. 4 the arrangement of permanent magnets between the claw poles.

FIG. 4 shows the combination of the aforementioned features with a supportive permanent-magnet excitation by means of tangentially-acting permanent magnets 15 between the parallel-flank claw poles. The permanent magnets are inserted between the side flanks of the U-sheets 12. They are secured through adhesion (for example, along with the gluing of the sheets). The permanent magnets are secured in the radial direction by the catches 16. The permanent magnets prevent the side ends of the U-sheets from bending laterally due to the centrifugal force. If the desired pole-gap width no longer matches the (tangential) magnet thickness, the outside sheet contour must be appropriately adapted. A shoulder is preferably provided in the contour. A "sinus-pole" embodiment is also possible.

Similarly to the standard claw-pole embodiment, an embodiment that has no slip ring and includes idle exciter coils is possible. In this case, however, both claw-pole-finger systems must be supplied with their magnetic field via an idle, annular-cylinder-type conductor piece and two additional magnet gaps. Support by permanent magnets of the aforementioned type is especially worthwhile here.

Because, as mentioned at the outset, the magnetically axially-acting exciting coil encompasses the entire exciter useful flux and the scatter flux of all p rotor poles of a claw side at higher powers, the exciter yoke passing axially through the exciter coil must have a minimum diameter, as stipulated by the magnetic saturation, which severely narrows the radial space for the exciter coil if a transition is not made to a larger rotor diameter.

A larger diameter necessitates a higher number of pole pairs. At a given rpm, this leads to an increased remagnetization frequency and greater losses.

Figure 5:
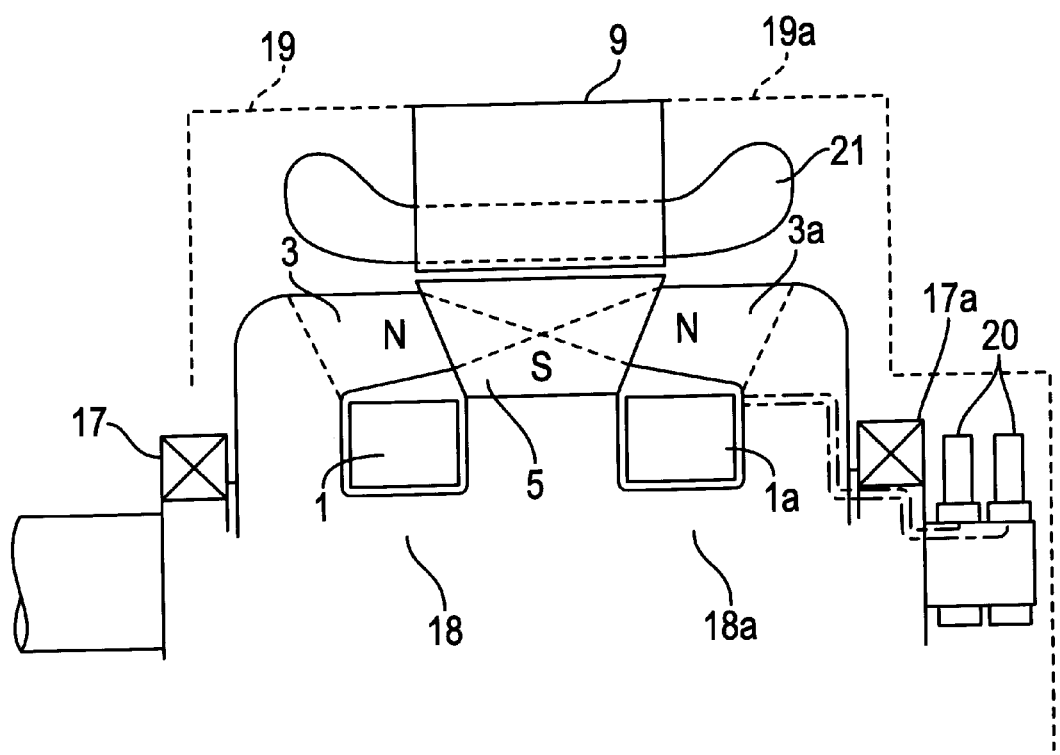
FIG. 5 the claw-pole arrangement of an oblong machine.

In a further embodiment of the invention, this problem can be circumvented by exciting the claw poles in a different manner. To this end, two similar claw-pole-finger systems (one delivers p north poles, the other p south poles) are no longer allowed to mesh with the pole fingers, alternatingly forming north and south poles in the circumferential direction within the bore of the stator-sheet stack; instead, a claw-pole toothed wheel 5 having p pole teeth is disposed axially in the plane of the stator-sheet stack 9, with a claw-pole-finger system 3, 3a that has p/2 fingers alternatingly extending into the gaps axially from both sides. The corresponding arrangement is shown in FIG. 5. Exciter coils 1, 1a are provided on the axial end faces of the p/2 claw-pole toothed wheel; the exciter yoke 18, 18a of these coils only has to guide the flux from the p/2 poles of the adjacent, adjoining claw-pole-finger system. Consequently, the sheet-stack length of the stator can be increased considerably with a predetermined diameter, with advantageous effects for the radial space required for a desirable power and the remagnetization losses. The magnetic excitations of the coils counteract one another, so the claw-pole toothed wheel lying in the center has p north poles, and the two claw-pole-finger systems together deliver p south poles in the gaps of the claw-pole toothed wheel 5.

It is critical that the magnetic resistances in the outer yokes of the claw poles 3, 3a not differ too greatly from those in the claw-pole toothed wheel 5.

This principle of axial flux partitioning can be expanded beyond two adjacent units seated on the same shaft.

The claw-pole wheel runs in bearings 17, 17a, with the end shields 19, 19a supporting the stator-sheet stack 9. The conventional slip rings 20 are provided for current supply.

What is claimed is:

1. A claw-pole machine having a stator and a rotor, and an exciter coil that is wound on a solid core in the rotor, with the solid core extending in a radial direction into two claw magnet wheels that end in a plurality of claw-pole fingers, having a plurality of solid, radially-outward-oriented parts, and a plurality of tangential side surfaces, which alternate axially, starting from two sides, wherein a plurality of U-shaped metal sheets are attached to solid, radially-outward-oriented parts of the claw-pole fingers, with each U-shaped metal sheet being layered in a rotary axial direction to prevent eddy currents, and further wherein the U-shaped metal sheets, formed by stamping, extend around tangential side surfaces of the claw-pole fingers in a wedge shape so that the U-shape metal sheets cannot follow centrifugal forces.

2. The claw-pole machine according to claim 1, wherein ends of the U-shaped metal sheets are welded to the claw-pole core.

3. The claw-pole machine according to claim 1, wherein said layered U-shaped metal sheets are glued to one another and the U-shaped metal sheets are glued to the claw-pole core.

4. The claw-pole machine according to claim 1, wherein said stator is made of iron and a magnet gap is formed between said stator and said layered U-shaped metal sheets, said magnet gap having a constant width.

5. The claw-pole machine according to claim 4, wherein said magnet gap between the claw-poles covered with said U-shaped metal sheets and the stator is constructed so as to yield a sinus pole.

6. The claw-pole machine according to claim 1, wherein tangentially-acting permanent magnets, mounted between ends of said layered U-shaped metal sheets, serve mechanically as anti-bending protection for said ends of said layered U-shaped metal sheets.

7. The claw-pole machine according to claim 1, wherein the exciter winding is partitioned axially in a magnetically-counteracting manner; that a pole toothed wheel having a plurality of pole teeth of identical polarity is provided between the exciter windings, said pole toothed wheel having outer ends, and the outer ends of said pole toothed wheel having a respective claw magnet wheel having either half as many claw fingers as the number of pole teeth, where the whole length of said claw fingers is magnetically-active, or an equal number of claw fingers as pole teeth, having a half-magnetic length, all of which have the same polarity.

8. A claw-pole machine having a stator and a rotor, and an exciter coil that is wound on a solid core in the rotor, with the solid core extending in a radial direction into two claw magnet wheels that end in a plurality of claw-pole fingers, having a plurality of solid, radially-outward-oriented parts, and a plurality of tangential side surfaces, which alternate axially, starting from two sides, wherein a plurality of U-shaped metal sheets are attached to solid, radially-outward-oriented parts of the claw-pole fingers, with each U-shaped metal sheet being layered in a rotary axial direction to prevent eddy currents, and further wherein a recess is stamped into each of the layered U-shaped metal sheets.

9. The claw-pole machine according to claim 8, wherein ends of the U-shaped metal sheets are welded to the claw-pole core.

10. The claw-pole machine according to claim 8, wherein said layered U-shaped metal sheets are glued to one another and the U-shaped metal sheets are glued to the claw-pole core.

11. The claw-pole machine according to claim 8, wherein said stator is made of iron and a magnet gap is formed between said stator and said layered U-shaped metal sheets, said magnet gap having a constant width.

12. The claw-pole machine according to claim 11, wherein said magnet gap between the claw-poles covered with said U-shaped metal sheets and the stator is constructed so as to yield a sinus pole.

13. The claw-pole machine according to claim 8, wherein tangentially-acting permanent magnets, mounted between ends of said layered U-shaped metal sheets, serve mechanically as anti-bending protection for said ends of said layered U-shaped metal sheets.

14. The claw-pole machine according to claim 8, wherein the exciter winding is partitioned axially in a magnetically-counteracting manner; that a pole toothed wheel having a plurality of pole tooth of identical polarity is provided between the exciter winding, said pole toothed wheel having outer ends, and the outer ends of said pole toothed wheel having a respective claw magnet wheel having either half as many claw fingers as the number of pole teeth, where the whole length of said claw fingers is magnetically-active, or an equal number of claw fingers as pole teeth, having a half-magnetic length, all of which have the same plurality.

* * * * *